US008893863B2

(12) United States Patent
Meckel

(10) Patent No.: US 8,893,863 B2
(45) Date of Patent: Nov. 25, 2014

(54) REDUCTION OF PARTICULATE EMISSIONS FROM VEHICLE BRAKING SYSTEMS

(75) Inventor: Nathan K. Meckel, Vista, CA (US)

(73) Assignee: Tech M3, Inc., Poway, CA (US)

( * ) Notice: Subject to any disclaimer, the term of this patent is extended or adjusted under 35 U.S.C. 154(b) by 1180 days.

(21) Appl. No.: 12/533,933

(22) Filed: Jul. 31, 2009

(65) Prior Publication Data
US 2009/0288921 A1 Nov. 26, 2009

Related U.S. Application Data

(63) Continuation-in-part of application No. 12/195,994, filed on Aug. 21, 2008.

(60) Provisional application No. 60/957,422, filed on Aug. 22, 2007, provisional application No. 60/971,879, filed on Sep. 12, 2007.

(51) Int. Cl.
*F16D 65/00* (2006.01)
*F16D 65/12* (2006.01)
*F16D 69/00* (2006.01)

(52) U.S. Cl.
CPC .......... *F16D 65/12* (2013.01); *F16D 2069/004* (2013.01); *F16D 2250/0046* (2013.01)
USPC ................................. 188/218 XL; 188/251 A

(58) Field of Classification Search
USPC .................. 188/218 XL, 18, 251 A
See application file for complete search history.

(56) References Cited

U.S. PATENT DOCUMENTS 2,753,808 A 7/1956 Kluge
3,171,527 A 3/1965 Ott (Continued)

FOREIGN PATENT DOCUMENTS

DE 538507 C 11/1931
EP 1256739 A2 11/2002

(Continued)

OTHER PUBLICATIONS

Terry Tritt, "Thermal Conductivity: Theory, Properties, and Applications", p. 100.

(Continued)

*Primary Examiner* — Bradley King
(74) *Attorney, Agent, or Firm* — Mintz Levin Cohn Ferris Glovsky and Popeo, P.C.

(57) ABSTRACT

A vehicle braking system reduces particulate emissions resulting from wear of the brake pad and rotor during stopping or slowing of a vehicle. The rotor includes at least one friction surface, that has an outer coating of a corrosion and wear-resistant material. This outer coating can optionally include a first layer comprising a crystalline material and a second layer overlaying and contacting the first layer and comprising an amorphous material. The first layer and the second layer can optionally have an inter-layer period of less than 10 nm such that the structure of the outer coating is that of a superlattice. A brake member that includes a friction material is mounted to a caliper on the vehicle with the friction material disposed opposite the at least one friction surface so that the friction material reversibly engages with the outer coating of the corrosion and wear-resistant material when the braking system is operated to stop or slow the vehicle. Contact between the friction material and the outer coating results in substantially reduced conversion of the friction material to dust while producing an improved coefficient of friction relative to standard braking systems. Related systems, apparatus, methods, and/or articles are also described.

18 Claims, 6 Drawing Sheets

(56) References Cited

U.S. PATENT DOCUMENTS

| | | | |
|---|---|---|---|
| 3,314,509 A | 4/1967 | Pelikan | |
| 3,443,454 A | 5/1969 | Hall | |
| 3,899,054 A | 8/1975 | Huntress et al. | |
| 3,993,415 A | 11/1976 | Hauser | |
| 4,180,622 A | 12/1979 | Burkhard et al. | |
| 4,555,239 A | 11/1985 | Miranti, Jr. | |
| 4,933,300 A | 6/1990 | Koinuma et al. | |
| 5,306,407 A | 4/1994 | Hauzer et al. | |
| 5,407,035 A | 4/1995 | Cole et al. | |
| 5,501,306 A | 3/1996 | Martino | |
| 5,725,913 A | 3/1998 | Wong et al. | |
| 5,838,522 A | 11/1998 | Komvopoulos et al. | |
| 5,861,203 A | 1/1999 | Yuan et al. | |
| 5,884,388 A | 3/1999 | Patrick et al. | |
| 5,901,818 A | 5/1999 | Martino | |
| 5,922,452 A | 7/1999 | Takahashi et al. | |
| 6,119,828 A | 9/2000 | Parsons | |
| 6,196,936 B1 | 3/2001 | Meckel | |
| 6,457,566 B1 | 10/2002 | Toby | |
| 6,536,564 B1 | 3/2003 | Garfinkel et al. | |
| 6,612,415 B2 * | 9/2003 | Yamane | 192/107 M |
| 7,246,586 B2 | 7/2007 | Hosenfeldt et al. | |
| 2002/0117360 A1 | 8/2002 | Toby | |
| 2002/0153213 A1 | 10/2002 | Gruber et al. | |
| 2003/0136614 A1 | 7/2003 | Feldmann et al. | |
| 2005/0087406 A1 | 4/2005 | Meckel | |
| 2005/0252739 A1 | 11/2005 | Callahan et al. | |
| 2008/0041675 A1 | 2/2008 | Baumgartner et al. | |

FOREIGN PATENT DOCUMENTS

| | | | |
|---|---|---|---|
| FR | 788671 A | 10/1935 | |
| FR | 2807484 A1 | 10/2001 | |
| JP | 63-026210 A | 2/1988 | |
| JP | 02-175859 A | 7/1990 | |
| JP | 07-208520 A | 8/1995 | |
| JP | 07224390 | 8/1995 | |
| JP | 09-118755 A | 5/1997 | |
| JP | 2003-049252 A | 2/2003 | |
| JP | 2004-316850 | 11/2004 | |
| KR | 10-1996-0001537 | 1/1996 | |
| KR | 10-1998-049479 A | 9/1998 | |
| KR | 10-1999-0036405 | 5/1999 | |
| KR | 10-2006-0051087 A | 5/2006 | |
| WO | WO-97/38235 A1 | 10/1997 | |
| WO | WO-98/50837 A1 | 11/1998 | |
| WO | WO-2006092270 A1 | 9/2006 | |

OTHER PUBLICATIONS

International Search Report and Written Opinion dated Jun. 19, 2008 for PCT application No. PCT/US2008/054465.

Communication pursuant to Article 94(3) dated Aug. 24, 2011 for EP application No. 08730296.4.

Extended EP Search Report dated Dec. 27, 2010 for EP application No. EP 08730296.4.

International Search Report and Written Opinion dated Dec. 12, 2008 for PCT/US2008/073907.

International Search Report dated Aug. 6, 1998 for PCT/US98/09303.

Extended European Search Report dated Jul. 14, 2010, for EP 08798408.4.

PCT International Search Report dated Mar. 29, 2011, issued in connection with counterpart PCT application No. PCT/US2010/043989.

* cited by examiner

REDUCTION OF PARTICULATE EMISSIONS FROM VEHICLE BRAKING SYSTEMS

CROSS-REFERENCE TO RELATED APPLICATIONS

The current application is a continuation-in-part of copending application for U.S. patent Ser. No. 12/195,994, filed on Aug. 21, 2008 and entitled "Brake Disk and Method of Making Same" which claims the benefit of U.S. provisional patent application Ser. No. 60/957,422, filed on Aug. 22, 2007 and U.S. provisional patent application Ser. No. 60/971,879, filed on Sep. 12, 2007. All applications to which the current application claims priority are incorporated by reference herein in their entireties.

TECHNICAL FIELD

The subject matter described herein relates to reducing particulate emissions from the braking systems of vehicles. For the purposes of this disclosure, the term "vehicle" includes, but is not limited to, automobiles, motorcycles, motorized scooters, on and off-road vehicles electric vehicles such as golf carts, light and heavy duty trucks, road tractors and semi-trailers, vans, off-road vehicles such as all-terrain vehicles and dune-buggies, trains, and the like. The subject matter disclosed herein is also applicable to braking systems used with aircraft landing gear, bicycles, military vehicles, and the like.

BACKGROUND

Particulate debris from friction components of a braking system, for example the rotors or drums and the pads or shoes, are typically generated during braking and released to the environment. Because of the chemical compositions typically employed in the friction components of braking systems, this particulate debris can include constituents, including but not limited to copper, cadmium, lead, mercury, and the like, that are known or suspected to have harmful effects when found in significant quantities in the environment.

Various regulations and laws intending to reduce potential negative environmental impacts of this particulate debris are either under consideration or in the process of passing in the legislatures of one or more U.S. states. These regulations and laws generally place limits on the amounts of harmful constituents that are permissible in brake friction components. Currently pending legislation in California (CA Senate Bill B 346) would prohibit the sale within the state of any motor vehicle brake friction materials containing specified constituents, such as for example copper, cadmium, lead, and mercury, in amounts that exceed certain concentrations. Safety is a concern as well, so pads made to comply with the new regulations must also meet applicable safety standards for braking performance, fade, and the like.

SUMMARY

In one aspect, an apparatus for reducing particulate emissions resulting from stopping or slowing a vehicle includes a rotating braking element that includes a bulk structural material and a friction surface. The friction surface includes an outer coating including a corrosion and wear-resistant material. The rotating brake element is adapted for installation as part of a braking system on the vehicle. The braking system also includes a movable brake member having a friction material with a friction material composition. The movable brake member is disposed in the braking system with the friction material disposed opposite the at least one friction surface so that the friction material reversibly engages with the outer coating of the corrosion and wear-resistant material when the braking system is operated to stop or slow the vehicle. Contact between the friction material and the outer coating produces a coated coefficient of friction that is substantially equivalent to or greater than an uncoated coefficient of friction produced by contact between the friction material and the bulk structural material without the outer coating. Active engagement of the brake member and the rotating brake element results in conversion of the friction material to dust at a coated loss rate that is at least 30% slower than an uncoated loss rate that results from active engagement of the brake member and the bulk structural material of the rotating braking element without the outer coating.

In a second interrelated aspect, a method for reducing particulate emissions from a vehicle braking system includes installing a rotating braking element as part of the vehicle braking system and mounting a brake member to a caliper of the vehicle braking system. The rotating braking element includes a bulk structural material and a friction surface. The friction surface includes an outer coating that includes a corrosion and wear-resistant material. The brake member includes a friction material having a friction material composition and is mounted with the friction material disposed opposite the at least one friction surface so that the friction material reversibly engages with the outer coating of the corrosion and wear-resistant material when the braking system is operated to stop or slow the vehicle. Contact between the friction material and the outer coating produces a coated coefficient of friction that is substantially equivalent to or greater than an uncoated coefficient of friction produced by contact between the friction material and the bulk structural material without the outer coating. Active engagement of the brake member and the rotating brake element results in conversion of the friction material to dust at a coated loss rate that is at least 30% slower than an uncoated loss rate that results from active engagement of the brake member and the bulk structural material of the rotating braking element without the outer coating.

In a third interrelated aspect, a method includes forming a rotating brake element from a bulk structural material such that the rotating brake element includes a friction surface and applying an outer coating of a wear and corrosion resistant material to the friction surface. The outer coating has a coated coefficient of friction with a friction material of a movable brake member adapted to contact the friction surface during engagement of a braking system. The coated coefficient of friction is substantially equivalent to or greater than an uncoated coefficient of friction between the friction material and a second friction surface of a second rotating brake element that does not have the outer coating applied. Release of a chemical species i from the friction material during use of the braking system occurs at a release rate, $R_{release,i}$, according to $$R_{release,i} = C_{pad,i} \times D_{pad}$$

where is a $C_{pad,i}$ mass concentration of the chemical species i in the friction material and $D_{pad}$ is an average degradation rate at which the friction material loses mass; and wherein $D_{pad}$ is reduced by at least 30% for use of the movable brake member with the rotating brake element having the outer coating applied relative to use of the movable brake member with the second rotating brake element having a second friction surface without the outer coating applied.

Optional variations of these aspects can include one or more of the following features. The outer coating of the corrosion and wear-resistant material can include a first layer that includes a crystalline material and a second layer overlaying and contacting the first layer and that includes an amorphous material. The friction surface can include a plurality of raised island formations separated by channels or gaps that permit air flow to cool the rotating braking element during active engagement with the brake member. The first layer and the second layer can have an inter-layer period of less than 10 nm and the outer coating can include a superlattice structure. The first layer can include one or more amorphous metals and the second layer can include one or more binary metals. The amorphous metal of the first layer can be selected from titanium, chromium, zirconium, aluminum, hafnium and an alloy combination thereof. The binary metal of the second layer can be selected from a metal nitride, a metal boride, a metal carbide and a metal oxide. The second layer further can include one or more nitrides, borides, carbides or oxides of the amorphous metal of the first layer. The rotating braking element can include a brake disk or rotor. Active engagement of the brake member and the rotating brake element can result in conversion of the friction material to dust at a coated loss rate that is approximately 10 to 30 times slower than an uncoated loss rate that results from active engagement of the brake member and the bulk structural material of the rotating braking element without the outer coating. Active engagement of the brake member and the rotating brake element can result in the friction material having a coated useful lifetime that is approximately 10 to 30 times longer than an uncoated useful lifetime that results from active engagement of the brake member and the bulk structural material of the rotating braking element without the outer coating.

The subject matter described herein provides many advantages that can include, but are not limited to reducing the wear rate of brake system friction components without sacrificing braking performance. Reducing the wear rate reduces the overall rate at which the materials that make up the brake system friction components are released into the environment. Thus, the current subject matter can dramatically reduce the pollution impacts of braking systems without requiring changes in the composition of the brake pads or shoes, which commonly account for the bulk of the particulate material released during braking. A lower wear rate translates into lower total emissions of particulate material per mile driven and can provide substantial benefits in reducing emission rates of environmentally harmful friction component constituents, including but not limited to copper, cadmium, lead, and mercury. For example, reducing the overall wear rate of a brake pad or shoe by 50% provides the same benefit in reducing copper emissions as would changing the composition of the brake pad or shoe so that it contains 50% less copper. Reducing the overall wear rate also has the ancillary benefit of reducing production of brake dust in general, which can provide aesthetic advantages by requiring less frequent clean-up of unsightly brake dust build-up on the wheels and/or other parts of a vehicle. Well tested, existing brake pad or shoe compositions which are known to provide good braking performance can continue to be used with the current subject matter, while also providing environmental benefits related to reduced emissions of harmful substances.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

Similar reference numerals in the drawings are intended to denote similar structures or other features of the described subject matter.

DETAILED DESCRIPTION

Figure 1:
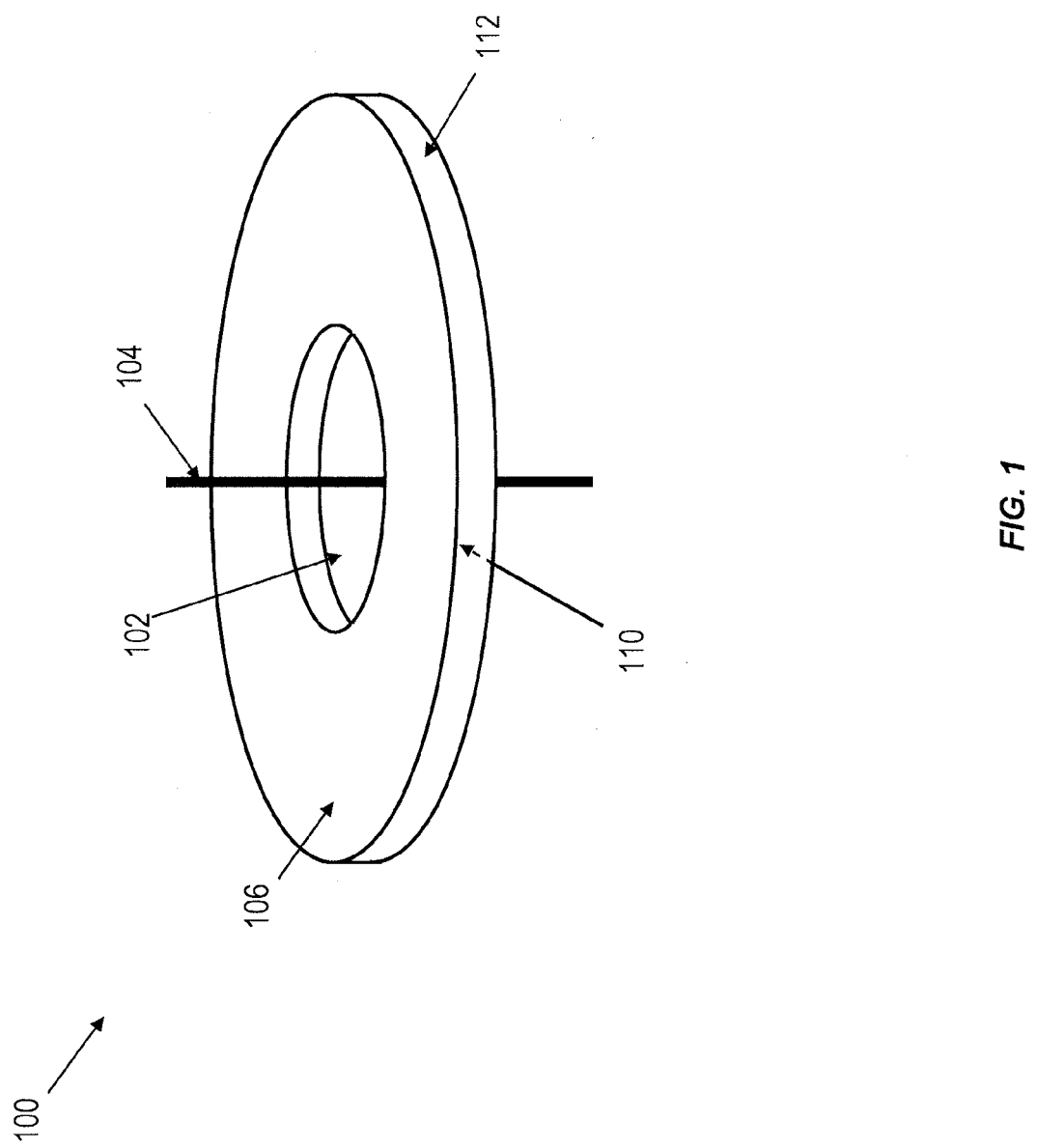
FIG. 1 is a perspective diagram illustrating a brake disk or rotor.

Simply using a brake pad or shoe with a composition containing lower amounts of toxic materials does not a priori lead to reduced rates of release of these materials into the environment because the rate of release of a compound or element in a brake pad is actually a function of both the concentration of the compound or element in the brake pad and the rate at which the brake pad or other friction component is consumed. Equation 1 shows this relationship:

$$R_{release,i} = C_{pad,i} \times D_{pad} \quad (1)$$

where $R_{release,i}$ is the rate (in mass units per distance driven) at which a chemical species, i, is released from the friction components of a braking system, $C_{pad,i}$ is the mass concentration of species i (in mass of species i per mass of the friction component (in one example, the brake pad), and $D_{pad}$ is the average degradation rate at which the friction component loses mass (in mass per distance driven). Reductions in $R_{release,i}$ can be promoted by decreasing either $C_{pad,i}$ or $D_{pad}$. Reducing both $C_{pad,i}$ and $D_{pad}$ can provide even greater reductions in $R_{release,i}$. The present subject matter provides systems, methods, techniques, and articles of manufacture that greatly reduce the rate of release of brake system friction materials to the environment independent of legislated or regulated changes to the composition of the friction materials. This highly beneficial result can be achieved using specialized corrosion-resistant coatings that a) prolong the life of the friction components of a vehicle braking system by reducing the wear rate at which the friction components degrade by generating particulate material and b) do not degrade the braking performance of the braking system.

The braking system of a vehicle typically includes one or more friction components that are pressed into contact to transform kinetic energy of the motor vehicle into heat and thereby slow the vehicle. These friction components can include a wheel-mounted rotating device, such as for example a rotor (also referred to as a brake disk) or drum and a movable device such as for example a brake pad or shoe, that is moved via a braking mechanism so that a friction material on the moveable device is forcibly contacted with a friction surface of the wheel-mounted rotating device. The braking mechanism can be controlled by a user operable system, such as a foot-operated brake pedal or a hand-operated grip device and can be mechanical, electrical, or hydraulic.

For brake systems in which the rotating device is a rotor or a disk, the mechanism can be a set of calipers and a mechanical or hydraulic system for applying pressure to a movable device mounted to each caliper to urge it against the friction surfaces of the rotor or disk. The rotor or disk typically has two opposing friction surfaces on opposite annular faces of a disk-like structure. A central hole in the rotor or disk is configured to be mounted co-axially with the wheel. If the rotating device is a drum, the movable device can be one or more shoes. The drum is a cylindrical device whose axis is the same as that of the wheel to which it is mounted. The friction surface of the drum is on the outer rotation surface. The shoes are urged against the friction surface by calipers, levers, or other devices that are controlled by the user.

FIG. 1 shows an example of a brake disk or rotor 100 that has a disk-shaped body with a central hole 102 adapted so that the brake disk 100 can be positioned over the hub of a wheel (not shown) and centered on the axis of rotation 104 of the wheel and brake disk or rotor 100 assembly. The shape of the brake disk or rotor 100 and the central hole 102 are shown in FIG. 1 as having a circular cross-section normal to the axis of rotation 104. However, this is merely an example. The cross-section of either the brake disk or rotor 100 and the central hole 102 can be non-circular as long as they are rotationally symmetrical about the axis of rotation. Opposing annular surfaces 106 and 110 are disposed on opposite sides of the brake disk or rotor 100 and can extend from the outer periphery 112 of the brake disk or rotor 100 to the central hole 102. At least a portion of each of the annular surfaces 106 and 110 serves as a friction surface against which the friction material of the brake pads or shoes is urged during braking. A corrosion resistant coating can be applied to the friction surfaces as described in more detail below.

Figure 2:
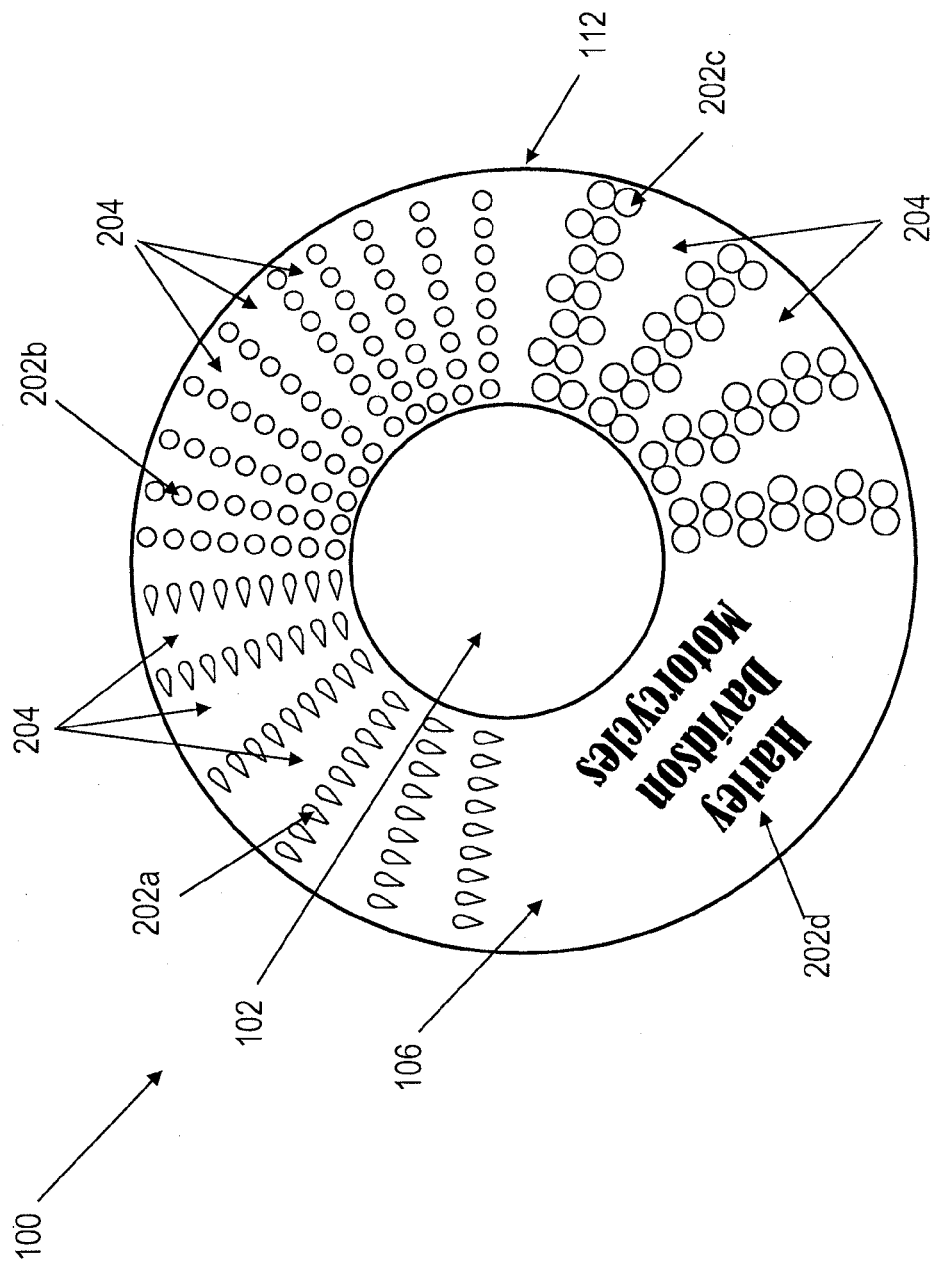
FIG. 2 is a diagram showing a top plan view of a brake disk or rotor.

In some implementations, the friction surfaces disposed on annular surfaces 106 and 110 of brake disk or rotor 100 include a plurality of raised land portions or island formations 202 with spaced air flow channels 204 between the island formations 202. Only the raised portions of the island formations contact the brake pads or shoes during braking in this arrangement, and comprise the wear surfaces of the brake disk or rotor 100. FIG. 2 shows a face-on view of a brake disk or rotor looking from above at one of the annular surfaces 106 that includes some examples of possible land portions or island formations 202 on the friction surface. In FIG. 2, four different possible island formations 202 are shown in each of four quadrants of an annular surface 106 of a brake disk or rotor 100. The arrangement of the island formations 202 shown in FIG. 2 is for illustrative purposes. In general, a uniform pattern is used throughout the friction surface of an annular surface 106 of a brake disk or rotor 100. In some implementations, however, a combination of the features shown or other comparable surface features can be included. As shown in FIG. 2, the island formations 202 can include tear drop shaped formations 202a, circle or dot shaped formations 202b, figure eight shaped formations 202c, and letter shaped formations 202d, with channels or voids 204 between and/or around the island formations allowing air flow extending between the formations. As seen in three of the quadrants in FIG. 2, the island formations 202 can be arranged in rows which extend radially from the central opening 102 of the brake disk or rotor 100 out to the peripheral edge 112, with radial air flow channels 204 extending outwardly between each adjacent pair of rows of island formations 202, in addition to channels which extend between adjacent pairs of island formations 202 in each row.

Figure 3:
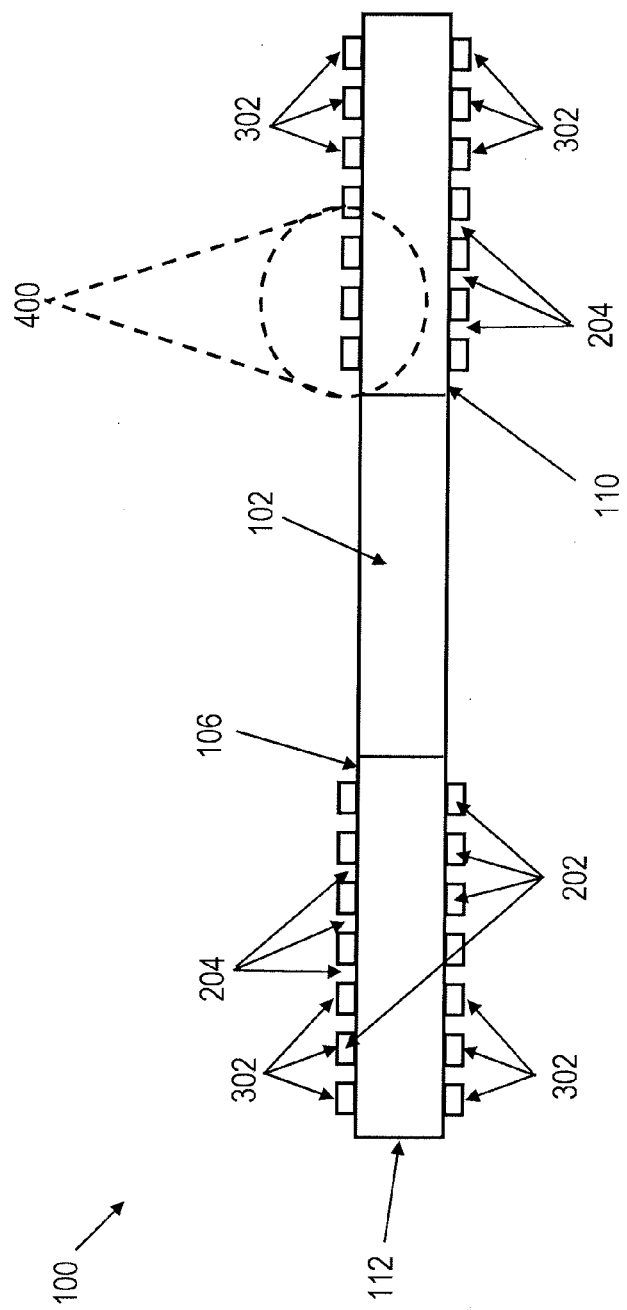
FIG. 3 is a diagram showing a cross-sectional view of a brake disk or rotor.

FIG. 3 shows a side cross sectional view of a brake disk or rotor 100 with the cross section taken along a diameter of the annular surfaces 106 and 110. As shown in FIG. 3, the island formations 202 have upper surfaces 302 which are at least substantially flat friction surfaces for contact with the brake pads or shoes during braking, and are designed with sufficient surface areas for braking purposes. Shapes and configurations of island formations 202 that differ from those shown in FIG. 2 and FIG. 3 can also be used, including but not limited to squares, trapezoids, rectangles, triangles, stars, letters or names, numbers, logos, trademarks, dashes, other geometric shapes, and the like, with or without rounded corners, can also be used to improve cooling and wear, to meet specific performance criteria, and/or to improve the aesthetic appearance of the brake disk or rotor 100.

Spaced island formations 202 arranged in a pattern to create cooling air channels and gaps 202 can be arranged to extend over an entire annular surface 106 and 110 of a brake disk or rotor 100. Alternatively, island formations 202 of any desired different shapes and sizes may be provided in patterns over the disk surface. The shape and positioning of the island formations 202 can be designed to be aesthetically pleasing in appearance which is particularly desirable when the disk surfaces are externally visible, as is the case with many motor cycle brake disks. The grooves or channels around the island formations 202 result in a significant reduction in the overall weight of the brake disk or rotor 100 which in turn improves the efficiency and performance of the motor vehicle. Additionally, the channels and gaps 204 allow for air flow around the island formations 202 for increased cooling and heat dissipation. The base of each channel or gap 204 can optionally be roughened or modulated to provide bumps or the like that create turbulence in air flow along the channel or gap 204 which can also improve the cooling effect.

Figure 4:
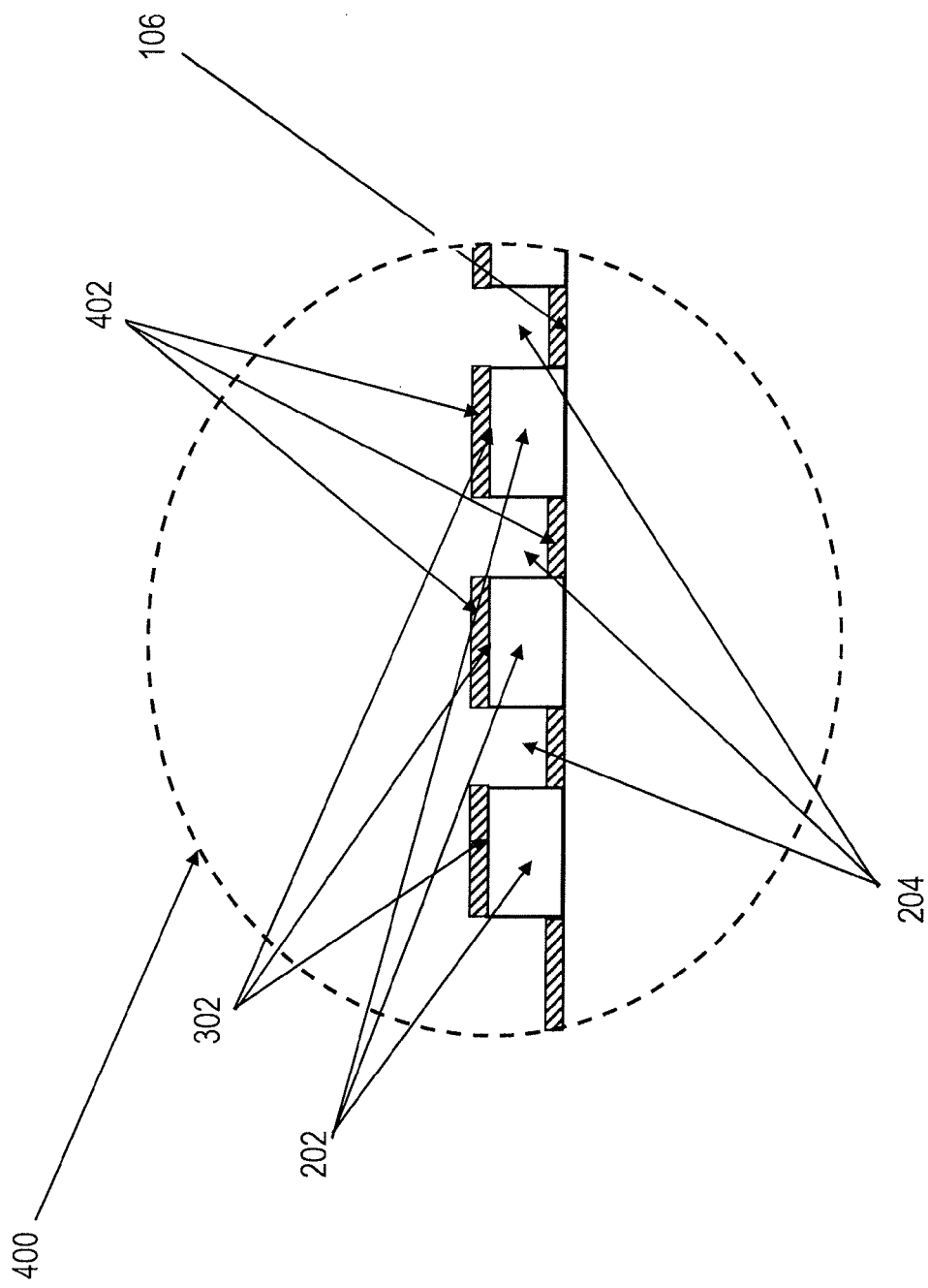
FIG. 4 is a diagram showing an expanded cross-sectional view of a brake disk or rotor surface.

Island formations 202 of desired shapes and dimensions can be formed in any suitable manner, for example by appropriate machining or other forming processes. After machining, the desired island formations 202 on one or both annular surfaces 106 and 110 of the brake disk or rotor 100, the entire annular surface 106 of the brake disk or rotor 100 can be coated with a wear and corrosion resistant coating 402 which eliminates or greatly reduces the wear of the braking surfaces 302 of the island formations 202. FIG. 4 shows an expanded view 400 of a portion of the annular surface 106 of a brake disk or rotor 100 with island formations 302 and air flow channels or gaps 204. In FIG. 4, the wear and corrosion resistant coating 402 is deposited on the upward facing surfaces 302 of the island formations 202 and also in the air flow channels or gaps 204. Alternatively, the island braking surfaces alone can be coated with the wear and corrosion resistant coating 402. The wear and corrosion resistant coating 402 can improve the overall look or aesthetics of the brake disk or rotor 100.

In one implementation, the wear and corrosion resistant coating 402 includes a first layer of a metal, such as a pure titanium metal, and a second layer that includes a nitride, boride, carbide or oxide of the metal used in the first layer. The coating can be applied using a physical vapor deposition source such as a cathodic arc source with a controlled gas atmosphere. The materials used for the wear and corrosion resistant coating 402 can be of different colors and can be designed to produce different surface appearances, such as a light reflective, shiny appearance, for example, particularly on regions of the annular surfaces 106 and 110 that are visible when the brake disk or rotor 100 is installed on a vehicle.

A surface finish can be produced on the annular surfaces 106 and 110 of the brake disk or rotor 100 substrate, including the island formations 202, by blasting the annular surfaces 106 and 110 with a continuous stream of particles (commonly referred to as bead blasting) which are typically harder than the annular surfaces 106 and 110. These particles can be round and/or smooth in shape or alternatively very irregular in shape. Various particle shapes can be used to impart a different surface finish or surface geography to the brake disk or rotor 100. For example, with round particles (of various sizes) and appropriate particle energy (air pressure or hydro pressure) a surface texture that microscopically resembles low soft rolling hills can be achieved. With irregular (crystalline) shaped particles, a very coarse surface geometry (very rugged/jagged peaks and valleys) can be imparted to the brake disk or rotor 100 surfaces. Other methods such as a sanded or a ground surface finish can be used to give a different appearance when coated with the wear and corrosion resistant coating 402. When the sanded or ground surface finish is done in a cross-hatched configuration and then coated with the wear and corrosion resistant coating 402, the coated brake disk or rotor 100 can be made to look as though it has a woven appearance such as is found in components made from carbon fiber.

In general, there are a multitude of surface finish techniques that can be utilized to impart a specific surface texture or geometry into the brake disk or rotor 100 prior to application of a wear and corrosion resistant coating 402. In one implementation, selected surface finishes can be implemented as described in co-pending U.S. patent application Ser. No. 12/034,590 filed on Feb. 20, 2008, the entire contents of which are incorporated herein by reference. In alternative variations, only the braking surfaces 302 of the island formations 202 are treated to produce a surface texture, for example, by masking the channels or gaps 204 between the island formations 202 during bead blasting or other surface treatments.

The substrate forming the bulk of the brake disk or rotor 100 can include any suitable material, including but not limited to cast iron, stainless steel, light weight metal alloys, ceramic materials, ceramic composite materials, titanium, or combinations thereof. The wear and corrosion resistant coating 402 can optionally be applied using the fixtures, techniques and materials as described in co-pending application Ser. No. 12/034,590 referenced above, and in co-pending U.S. patent application Ser. No. 12/034,599 on Feb. 20, 2008, the entire contents of which are incorporated herein by reference.

Figure 5:
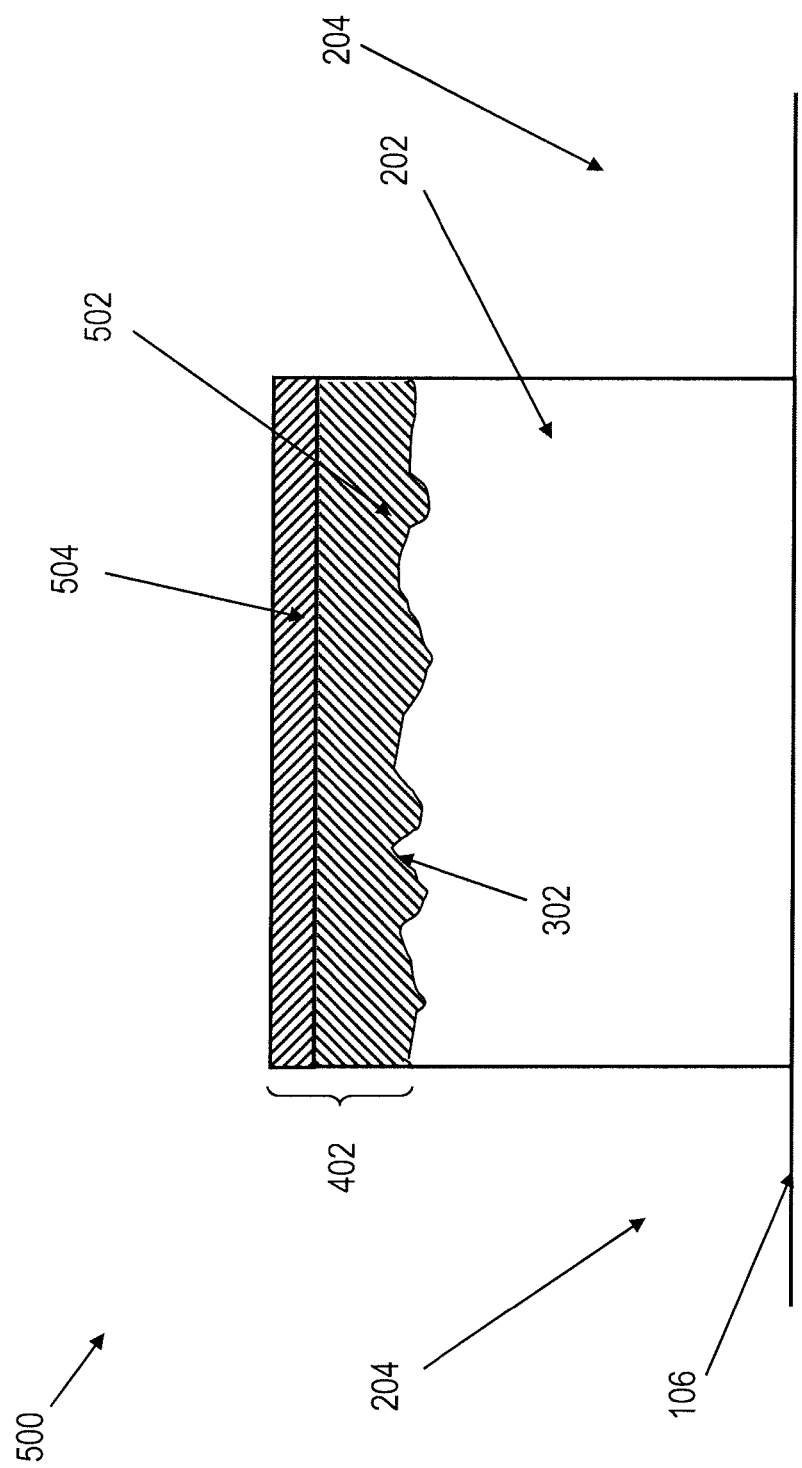
FIG. 5 is a diagram showing a closer expanded cross-sectional view of a brake disk or rotor surface.

As shown in FIG. 5, which is a very expanded view 500 of an island formation 202 of a brake rotor or disk 100, the wear and corrosion resistant coating 402 sits upon the a braking surface 302 prepared as described above. The wear and corrosion resistant coating 402 can include a first layer 502 of a material having an amorphous structure (i.e. a non-crystalline structure) or a crystalline structure. This first layer 502 is applied directly onto the prepared braking surface 302. The amorphous or crystalline material can in some implementations be a metal such as titanium, chromium, zirconium, aluminum, hafnium or an alloy thereof. The wear and corrosion resistant coating 402 further includes a second layer 504 that overlays and contacts the first layer 502. Though the layers are depicted as distinct in FIG. 5, in some implementations, the first layer 502 and the second layer 504 intermingle or merge such that no distinct boundary exists between them. The second layer 504 can in some variations include one or more binary metals, for example, one or more metal nitrides, metal borides, metal carbides and metal oxides. The second layer 504 can alternatively or additionally include one or more nitrides, borides, carbides or oxides of the metal used in the first layer 502. In some implementations, the wear and corrosion resistant coating 402 can include more than two layers of alternating metal and metal compound materials that are applied in order to impart specific physical properties to the brake disk or rotor 100. In some implementations of a wear and corrosion resistant coating 402, the first layer 502 can include amorphous titanium and the second layer 504 can include a titanium nitride (TiN, Ti.sub.2N, etc.). Multiple alternating instances of the first layer 502 and the second layer 504 can be configured to form a lattice structure or a super lattice structure that includes thin films formed by alternately depositing two different components to form layered structures. Multilayers become superlatices when the period of the different layers is less than about 10 nm (100 Angstroms). With this cooperation of structure, a wear and corrosion resistant coating 402 having a service life to exceed approximately 100,000 vehicle miles or more can be obtained. it should be noted that abbreviations (e.g. TiN, Ti.sub.2N, etc.) are used herein as a shorthand rather than an exact chemical label, and do not suggest that the stoichiometry of the indicated compound must be exactly as stated in the abbreviation.

As shown in FIG. 5, the contact surface 302 of the island formation 202 can be prepared with a roughened surface treatment prior to application of the first layer 502 of the wear and corrosion resistant coating 402. This pre-roughening treatment is optional, and can be imparted by blasting the annular surface 106 and 110 of the brake disk or rotor 100 with irregular shaped particles, as described above, such that the braking surface 302 includes a series of peaks and valleys with angular and irregular apexes at each peak and valley. Alternative surface textures may be rounded, cross-hatched, or woven in appearance, as described above. When a braking surface 302 prepared in this manner is subsequently coated with one or more coating layers of the wear and corrosion resistant coating 402, the resultant, substantially flat surface can exhibit a three dimensional appearance or woven texture. In addition, the composition and thickness of the layers forming the wear and corrosion resistant coating 402 can be selected to achieve desired light reflection and absorption characteristics in order to produce an attractive ornamental appearance.

As noted above, the island formations 202 or raised land portions on the annular surfaces 106 and 110 of a brake disk or rotor 100 can facilitate cooling of the brake disk or rotor 100 by increasing and directing air flow around and between the island formations during braking. By increasing the ability of the brake disk to dissipate heat, the risk of brake fade, wear and warpage is reduced, and can increase the effective service life of the brake disk or rotor. In addition, the channels or gaps 204 between adjacent island formations 202 reduce the overall weight of the brake disk or rotor 100, reducing the amount of material required. Finally, the island formations 202 can be designed to produce a visually attractive appearance in the visible portion of the brake disk, adding to the overall look of a vehicle such as a motor cycle where the brake disks are clearly visible.

Furthermore, brake disks or rotors 100 as well as brake drums prepared as described herein also offer distinct advantages in wear rates of brake pads or shoes used together with the brake disks or rotors 100 or brake drums. Braking performance equal to or greater than that of brake disks or rotors without the wear and corrosion resistant coating 402 is achieved using standard brake pads and brake disks or rotors that include the wear and corrosion resistant coating 402. In addition, the brake disk or rotor 100 with the wear and corrosion resistant coating 402 experiences a much slower wear rate than a brake disk or rotor 100 without the wear and corrosion resistant coating 402. Furthermore, the wear rate of the brake pads or shoes used in a braking system with a brake disk or rotor 100 with a wear and corrosion resistant coating 402 such as described herein is also substantially reduced, in some examples providing a functional lifetime of the brake pads or shoes that is 50% to 500% longer than that of the brake pads or shoes used in a braking system with a standard brake disk or rotor that does not have a wear and corrosion resistant coating 402 according to the current subject matter. In other examples, the wear rate of the brake pads or shoes used in a brake system with a brake disk or rotor 100 or a brake drum whose friction surfaces have a wear and corrosion resistant coating 402 and/or a plurality of island formations 202 as described herein can be reduced to no more than approximately 90% of the wear rate of the same brake pads or shoes used with a standard brake disk or rotor or a standard brake drum. In further implementations, the wear rate of the brake pads or shoes used in conjunction with a brake disk or rotor 100 or a brake drum whose friction surfaces have a wear and corrosion resistant coating 402 and/or a plurality of island formations 202 as described herein can be reduced to a range of approximately 20% to 40% of the wear rate of the same brake pads or shoes used with a standard brake disk or rotor or a standard brake drum.

Figure 6:
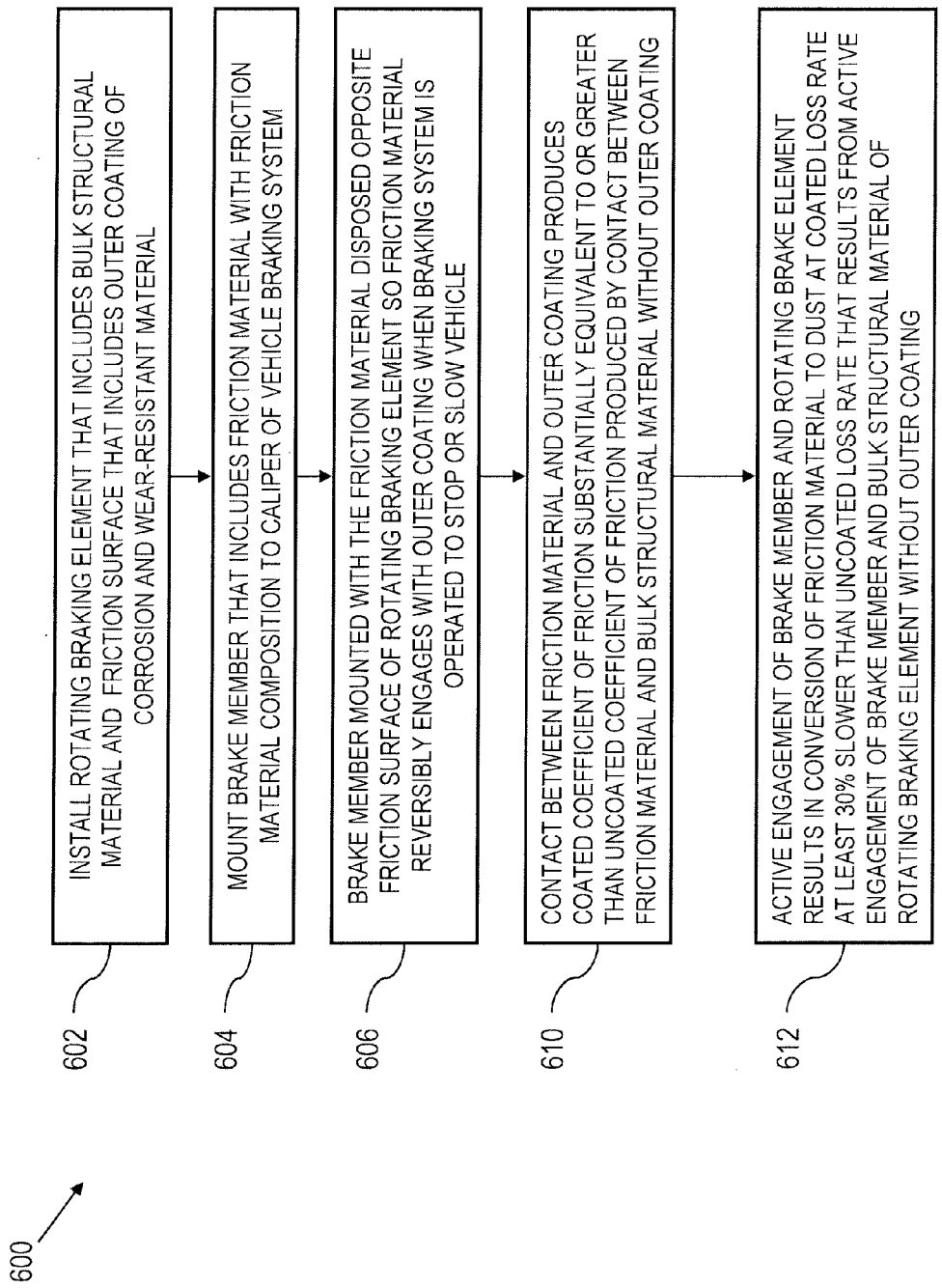
FIG. 6 is a process flow diagram illustrating a method for reducing particulate emissions form braking.

In another implementation of the current subject matter, a method is provided for reducing particulate emissions from vehicle braking systems. FIG. 6 shows a process flow chart illustrating an example of such a method. At 602, a rotating braking element is installed as part of the vehicle braking system. The rotating braking element, which can be a rotor, a disk, a drum, or the like, includes a bulk structural material and a friction surface that includes an outer coating that includes a corrosion and wear-resistant material. the wear and corrosion resistant material of the outer coating can be similar to those described herein. At 604, a brake member is mounted to a caliper of the vehicle braking system. The brake member, which can be a brake pad, brake shoe, or the like, includes a friction material having a friction material composition. At 606, the brake member is mounted with the friction material disposed opposite the at least one friction surface so that the friction material reversibly engages with the outer coating of the corrosion and wear-resistant material when the braking system is operated to stop or slow the vehicle. At 610, contact between the friction material and the outer coating produces a coated coefficient of friction that is substantially equivalent to or greater than an uncoated coefficient of friction produced by contact between the friction material and the bulk structural material without the outer coating. At 612, active engagement of the brake member and the rotating brake element results in conversion of the friction material to dust at a coated loss rate that is at least 30% slower than an uncoated loss rate that results from active engagement of the brake member and the bulk structural material of the rotating braking element without the outer coating. In optional variations, the coated loss rate can be in a range of 50% to 500% slower than that for an uncoated rotating brake element. In this manner, the current subject matter provides markedly reduced particulate emissions from a vehicle braking system relative to standard rotor systems. thus, emissions of deleterious elements of the brake member composition can be substantially reduced without changing the composition of the brake member.

Brake rotors according to the current invention were tested using a standard dynamometer test schedule which is summarized in Table 1. The test includes 14 sections or phases, which are listed in the first column of Table 1. The characteristics of each section or phase of the test are summarized based on number of stops in the section or phase, initial speed of the vehicle prior to each stop, final speed of the vehicle after each stop, pressure applied between the brake pads and the rotor, and the rate of deceleration.

TABLE 1

Dynamometer Test Schedule

| Section or Phase | # of Stops | Initial Speed (MPH) | Final Speed (MPH) | Pressure (psi) | Deceleration (ft · s$^{-2}$) |
|---|---|---|---|---|---|
| Green Effectiveness | 9 | 20 | 0 | 100-900 | |
| | 9 | 40 | 0 | | |
| Burnish | 200 | 40 | 0 | | 9.0 |
| First Effectiveness | 9 | 20 | 0 | 100-900 | |
| | 9 | 40 | 0 | 100-900 | |
| | 9 | 60 | 0 | 100-900 | |
| | 9 | 90 | 0 | 100-900 | |
| First Fade | 10 | 60 | 0 | | 9.0 |
| First Recovery | 12 | 30 | 0 | | 9.0 |
| Reburnish | 35 | 40 | 0 | | 9.0 |
| Second Effectiveness | 9 | 20 | 0 | 100-900 | |
| | 9 | 40 | 0 | 100-900 | |
| | 9 | 60 | 0 | 100-900 | |
| | 9 | 90 | 0 | 100-900 | |
| Second Fade | 10 | 60 | 0 | | 9.0 |
| Second Recovery | 12 | 30 | 0 | | 9.0 |
| Third Effectiveness | 9 | 20 | 0 | 100-900 | |
| | 9 | 40 | 0 | 100-900 | |
| | 9 | 60 | 0 | 100-900 | |
| | 9 | 90 | 0 | 100-900 | |
| Wet Effectiveness | 9 | 20 | 0 | 100-900 | |
| | 9 | 40 | 0 | 100-900 | |
| | 9 | 60 | 0 | 100-900 | |
| | 9 | 90 | 0 | 100-900 | |
| Low Energy Durability | 500 | 40 | 0 | | 7.0 |
| High Energy Durability | 500 | 60 | 0 | | 9.0 |
| Final Effectiveness | 9 | 20 | 0 | 100-900 | |
| | 9 | 40 | 0 | 100-900 | |
| | 9 | 60 | 0 | 100-900 | |
| | 9 | 90 | 0 | 100-900 | |

Table 2 summarizes the results of tests according to the protocol summarized in Table 1 with Hawk Organic rotors. Identical Hawk Organic Pads (Model No. RGHP44002G) available from Wellman Products Group of Akron, Ohio) were tested under similar conditions using the protocol of Table 1. The first pad was tested with a polished but uncoated rotor that does not have a wear and corrosion resistant coating 402 or island formations 202 according to the current subject matter. The second pad was tested with a brake disk 100 having a wear and corrosion resistant coating 402 with a polished finish on the friction surfaces of the rotor 100. The brake pad used in these tests was analyzed using an Oxford Handheld Metal Analyzer that determines composition using X-ray fluorescence (model no. X-MET5100, available from Oxford Instruments U.S.A. of Scotts Valley, Calif.). The determined composition by mass was approximately 21.4% zirconium, 16.4% zinc, 13.7% iron, 0.55 strontium, 20.9% titanium, 13.9% copper, and 13.1% antimony.

As shown in Table 2, the pad tested with the rotor that included a wear and corrosion resistant coating 402 on the friction surfaces of the rotor 100 according to implementations of the current subject matter experienced approximately 90% less loss of mass in the performance test, better than 30% less wear by mass in the low energy durability test, and approximately 85% less wear by mass in the high energy durability test. The rotor with the wear and corrosion resistant coating 402 experienced a nearly statistically insignificant loss of mass—at least 98% slower mass wear rate than the uncoated rotor. The thickness of the rotor with the wear and corrosion resistant coating 402 also decreased in thickness by amount that was smaller than the resolution of the instruments and that was at least 95% less than that of the uncoated rotor.

TABLE 2

Results of testing of uncoated and coated rotors.

| Test System | | Performance Test (Pad Wear) | Low Energy Durability (Pad Wear) | High Energy Durability (Pad Wear) | Rotor Wear |
|---|---|---|---|---|---|
| Hawk Pad with Uncoated Rotor | Wear (inches) | 0.0515 | 0.0057 | 0.299 | 0.0011 |
| | Weight Loss (grams) | 3.1 | 1.1 | 5.2 | 6.3 |
| Hawk Pad with Rotor according to current subject matter | Wear (inches) | 0.0025 | 0.0043 | 0.0026 | 0.00004 |
| | Weight Loss (grams) | 0.3 | 0.8 | 0.8 | 0.1 |

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. A braking system for reducing particulate emissions resulting from stopping or slowing a vehicle, comprising:
   a rotating braking element that comprises a bulk structural material and a friction surface, the friction surface comprising a coating that comprises a corrosion and wear-resistant material, the coating comprising a first layer comprising a crystalline material and a second layer overlaying and contacting the first layer and comprising an amorphous material, the rotating braking element further comprising a coarse surface geometry with jagged peaks and valleys under the coating, the friction surface comprising a plurality of raised island formations separated by channels or gaps that permit air flow to cool the rotating braking element during active engagement with the movable brake member; and
   a movable brake member that comprises a friction material having a friction material composition, the movable brake member being disposed with the friction material disposed opposite the friction surface of the rotating braking element so that the friction material reversibly engages with the coating of the corrosion and wear-resistant material when the braking system is operated to stop or slow the vehicle.

2. A braking system as in claim 1, wherein the first layer and the second layer have an inter-layer period of less than 10 nm and the coating comprises a superlattice structure.

3. A braking system as in claim 1, wherein the second layer comprises a binary metal.

4. A braking system as in claim 1, wherein the crystalline material of the first layer comprises at least one metal selected from titanium, chromium, zirconium, aluminum, hafnium and an alloy combination thereof.

5. A braking system as in claim 4, wherein the second layer further comprises one or more nitrides, borides, carbides or oxides of the metal of the first layer.

6. A braking system as in claim 1, wherein the rotating braking element comprises a brake disk or rotor.

7. A braking system as in claim 1, wherein active engagement of the brake member and the rotating brake element results in conversion of the friction material to dust at a coated loss rate that is approximately 10 to 30 times slower than an uncoated loss rate that results from active engagement of the brake member and the bulk structural material of the rotating braking element without the coating.

8. A braking system as in claim 1, wherein active engagement of the brake member and the rotating brake element results in the friction material having a coated useful lifetime that is approximately 10 to 30 times longer than an uncoated useful lifetime that results from active engagement of the brake member and the bulk structural material of the rotating braking element without the coating.

9. A braking system as in claim 1, wherein both the uncoated rotating braking element and rotating braking element are polished, the friction surface being the polished portion of the rotating braking element.

10. A braking system as in claim 1, wherein the coarse surface geometry with jagged peaks and valleys is imparted using irregular shaped particles.

11. A braking system as in claim 1, wherein contact between the friction material and the coating produces a coated coefficient of friction that is substantially equivalent to or greater than an uncoated coefficient of friction produced by contact between the friction material and the bulk structural material without the coating.

12. A braking system as in claim 1, wherein active engagement of the brake member and the rotating braking element according to a dynamometer test schedule results in conversion of the friction material to dust at a coated loss rate that is at least 30% slower than an uncoated loss rate that results from active engagement of the brake member and the bulk structural material of the rotating braking element without the coating according to the dynamometer test schedule.

13. A braking system as in claim 1, wherein the coarse surface geometry with jagged peaks and valleys is found only on the friction surface of the rotating braking element.

14. A braking system as in claim 3, wherein the binary metal of the second layer comprises at least one of a metal nitride, a metal boride, a metal carbide, and a metal oxide.

15. A method for reducing particulate emissions resulting from stopping or slowing a vehicle, the method comprising:
   moving a brake member that comprises a friction material having a friction material composition such that the friction material reversibly engages a rotating braking element that comprises a bulk structural material and a friction surface, the brake member being disposed in a vehicle braking system with the friction material disposed opposite the friction surface of the rotating braking element, the friction surface comprising a coating that comprises a corrosion and wear-resistant material, the coating comprising a first layer comprising a crystalline material and a second layer overlaying and contacting the first layer and comprising an amorphous material, the vehicle braking system comprising the brake member and the rotating braking element; and flowing air through channels or gaps between a plurality of raised island formations on the friction surface to cool the rotating braking element during active engagement with the brake member, the rotating braking element further comprising a coarse surface geometry with jagged peaks and valleys under the coating.

16. A method as in claim 15, wherein the crystalline material of the first layer of the coating comprises at least one metal selected from titanium, chromium, zirconium, aluminum, hafnium and an alloy combination thereof.

17. A method as in claim 16, wherein the second layer of the coating further comprises one or more nitrides, borides, carbides or oxides of the metal of the first layer.

18. A method as in claim 15, further comprising converting the friction material to dust at a coated loss rate that is approximately 10 to 30 times slower than an uncoated loss rate that results from active engagement of the brake member and the bulk structural material of the rotating braking element without the coating.

\* \* \* \* \*